United States Patent [19]

Kimura

[11] Patent Number: 6,157,437
[45] Date of Patent: Dec. 5, 2000

[54] LIGHT-SENSITIVE MATERIAL TRANSPORT DEVICE

[75] Inventor: Youichi Kimura, Kanagawa, Japan

[73] Assignee: Fuji Photo Film Co., Ltd., Kanagawa, Japan

[21] Appl. No.: 09/294,202

[22] Filed: Apr. 20, 1999

[30] Foreign Application Priority Data

Apr. 20, 1998 [JP] Japan .................................. 10-109039

[51] Int. Cl.[7] .......................... G03B 27/52; G03B 29/00; A47J 45/00
[52] U.S. Cl. ................ 355/40; 355/29; 355/41; 198/165; 294/64.1
[58] Field of Search ................ 355/40, 29, 39, 355/41; 209/45; 2/700; 198/165; 294/64.1

[56] References Cited

U.S. PATENT DOCUMENTS

| 740,534 | 10/1903 | Cleathero ............................... 294/64.1 |
| 2,189,698 | 2/1940 | Bierbrauer ............................. 198/165 |
| 3,880,274 | 4/1975 | Bechtloff et al. ...................... 198/165 |
| 5,206,679 | 4/1993 | Tahara et al. .......................... 355/29 |
| 5,504,555 | 4/1996 | Yamamoto ............................. 355/29 |
| 5,896,187 | 4/1999 | Matsumoto ............................ 355/29 |
| 6,008,879 | 12/1999 | Masutani .............................. 355/40 |
| 6,025,904 | 2/2000 | Kiyonaga et al. ..................... 355/41 |

*Primary Examiner*—Russell Adams
*Assistant Examiner*—Raghuveer Bindingnavele
*Attorney, Agent, or Firm*—Sughrue, Mion, Zinn, Macpeak & Seas, PLLC

[57] ABSTRACT

The light-sensitive material transport device includes a placement and transport mechanism for placing and transporting the exposed light-sensitive material after it is received from the scanning transport mechanism. The light-sensitive material transport device also includes an auxiliary transport mechanism spaced apart upward from the placement and transport mechanism, for being driven in the same direction as the placement and transport mechanism. The light-sensitive material transport device receives the cut sheets of the exposed light-sensitive material from the scanning transport mechanism without imparting any effect to the scanning transport and can subsequently transport it in a stable and sure manner, as well as preferably performing correction of the curl of the cut sheets of the light-sensitive material.

18 Claims, 3 Drawing Sheets

LIGHT-SENSITIVE MATERIAL TRANSPORT DEVICE

BACKGROUND OF THE INVENTION

This invention relates to the technical field of a light-sensitive material transport device that is to be used in an image recording apparatus which exposes light-sensitive materials to record a latent image.

Heretofore, the image recorded on photographic films such as negatives and reversals (which are hereunder referred to simply as "films") has been commonly printed on light-sensitive materials such as photographic paper by means of direct (analog) exposure, in which projected light from the film is allowed to be incident on the light-sensitive material to achieve its a real exposure.

A new technology has recently been introduced and this is a printer that relies upon digital exposure. Briefly, the image recorded on a film is read photoelectrically, converted to a digital image data (signal) and subjected to various image processing operations to produce image data for recording purposes; recording light that has been modulated in accordance with the image data for the recording purposes is used to scan and expose a light-sensitive material to record a latent image, which is subsequently developed and outputted as a print (photograph). The printer operating on this principle has been commercialized as a digital photoprinter.

In the digital photoprinter, the image on a film is read photoelectrically and gradation correction and other operations are performed by subsequent image (signal) processing to determine exposing conditions. Hence, the digital photoprinter has many capabilities in image processing such as editing of printed images by, for example, assembling a plurality of images or splitting a single image into plural images, as well as color/density adjustment and edge enhancement; as a result, prints can be output after various image processing operations have been performed in accordance with specific uses. In addition, the data on a printed image can be supplied into a computer or the like and stored in recording media such as a floppy disk.

A further advantage of the digital photoprinter is that, compared to the prints produced by the conventional method of direct exposure, those which are output by the digital photoprinter have better image quality in such aspects as resolution and color/density reproduction. Having these features, the digital photoprinter is basically composed of an input machine having a scanner (image reader) and an image processor and an output machine having both an exposing device (image recording apparatus) and a developing device.

In the scanner, projected light carrying the image recorded on the film is photoelectrically read by an image sensor such as a CCD sensor, the image being then captured by photoelectric conversion and sent to the image processor as data for the image on the film (i.e., the image data signal). In the image processor, the image data are subjected to specified image processing operations and the resulting output image data for image recording (i.e., exposing conditions) are sent to the exposing device.

In the exposing device, if it is of a type that relies upon exposure by scanning with an optical beam, the latter is modulated in accordance with the image data sent from the image processor and deflected in a main scanning direction as the light-sensitive material is transported in an auxiliary direction perpendicular to the main scanning direction, whereby a latent image is formed as the result of scan exposure of the light-sensitive material with the optical beam and a back print is also recorded. In the developing device (processor), the exposed light-sensitive material is subjected to development and other specified processing operations so as to output a print which reproduces the image that has been recorded on the film.

In the exposing device, whether it is in the digital photoprinter or an ordinary photoprinter that relies upon "direct" exposure, a virgin light-sensitive material is in the form of a magazine, i.e., a roll contained in a lightproof case. The light-sensitive material is withdrawn out of the magazine loaded in the exposing device and further transported for exposure and other necessary steps.

In the ordinary photoprinter, the light-sensitive material being transported is not cut but remains a web as it is subjected to exposure, back print recording, development, rinse, drying and other necessary steps and only after these steps are complete, the light-sensitive material is cut to individual prints of a specified length.

This process requires that frame information (frame punches) for delineating individual frames (or prints) be formed before or after the exposure of the light-sensitive material. However, the portion of the light-sensitive material where the frame information is formed is simply a waste of space. In addition, frame information have to be formed by special means having a punch, a sensor or the like.

In the photoprinter of the above type, it is considered to cut the light-sensitive material to form a cut sheet in accordance with one sheet of a print and then to expose the cut sheet of the light-sensitive material. In fact, the above method is commercialized in the photoprinter of analog type.

In image recording employing scan exposure, if transport speed for scanning (scanning transport speed) of the light-sensitive material should fluctuate, density of image becomes uneven and, as a result, images of high quality can not be recorded. Therefore, it must be prevented as much as possible that the transport means of the light-sensitive material which is located in the downstream of the scanning transport means will give detrimental effects, for example, load fluctuation on the scanning transport of the light-sensitive material in the course of exposure.

In order to solve the above problems, the image recording apparatus employs several methods such as the method which uses a highly precise scanning transport means and controls this scanning transport means highly precisely, as well as allows the other transport means located in the down stream of the scanning transport means to coincide the speed of the transport by the other transport means with that of the scanning transport highly precisely, the method for forming a loop of the light-sensitive material in an area between the scanning transport means and the other means located in its downstream and the like, whereupon it is prevented that the other transport means will give any influence on the scanning transport.

However, the image recording apparatus that exposes the light-sensitive material after it is cut to sheets is liable to give load fluctuation to the light-sensitive material when the exposed advancing end of the light-sensitive material contacts or is particularly pinched with the downstream transport means. This problem can not be solved by the methods described above, thereby generating uneven scanning transport.

Though this uneven scanning transport is instantaneous and small in scale, an unevenness of the image caused by this uneven scanning transport is a linear unevenness in a main scanning direction, so-called, unevenness in a stripe form. This kind of unevenness is very conspicuous even with a small quantity, i.e., highly noticeable, thereby causing deterioration of the image quality to a great extent.

The exposed light-sensitive material must be smoothly transported to the developing device and the like. However, the virgin light-sensitive material wound in a roll form is loaded in the image recording apparatus so that, even after the light-sensitive material is cut into sheets in accordance with a print size, it still keeps a curling way that prevents a consistent transport of the light-sensitive material. Moreover, curls are not the same in the beginning and in the end portions of the roll of the light-sensitive material. Difference in the form among curls is so large that the consistent transport of the light-sensitive material becomes even more difficult.

SUMMARY OF THE INVENTION

An object, therefore, of the present invention is to solve the above described problems in the prior art and provide a light-sensitive material transport device which is to be used in an image recording apparatus (exposing apparatus) performing digital scan exposure on a cut sheet of a light-sensitive material for thereafter feeding the thus exposed sheets of the light-sensitive material to a developing device, and which receives the exposed light-sensitive material from a scanning transport means and then transports it to the downstream, wherein the device is capable of receiving the exposed light-sensitive material from the scanning transport means and then stably or consistently transporting it to the downstream, as well as performing correction of a curl of the light-sensitive material.

In order to achieve the object, the invention provides a light-sensitive material transport device which is to be used in an image recording apparatus that forms in a specified position a scanning line of recording light extending in a main scanning direction by an exposing optical system, as well as transports a light-sensitive material with a specified length for scanning in an auxiliary direction perpendicular to said main scanning direction by scanning transport means in such a way that the light sensitive material is held in said recording position, so as to expose the light-sensitive material for recording a latent image thereon by means of said recording light, and thereafter supplies the exposed light-sensitive material to a processor, said device comprising:

placement and transport means for placing and transporting the exposed light-sensitive material after it is received from said scanning transport means; and auxiliary transport means spaced apart upward from said placement and transport means, said auxiliary transport means being driven in the same direction as said placement and transport means.

Preferably, said placement and transport means is a belt conveyor.

Preferably, said auxiliary transport means is an auxiliary belt conveyor.

More preferably, said placement and transport means is a main belt conveyor, wherein said auxiliary transport means is the auxiliary belt conveyor, and wherein friction coefficient of a belt surface of said main belt conveyor is same or larger than that of the belt surface of said auxiliary belt conveyor.

Preferably, the friction coefficient of the belt surface of said auxiliary belt conveyor is not more than 0.6, while the friction coefficient of the belt surface of said main belt conveyor is not less than 0.6.

Preferably, said auxiliary belt conveyor comprises a separated belt composed of a plurality of conveyor belts.

Preferably, transport speed of the light-sensitive material by said placement and transport means and the auxiliary transport means is faster than that by said scanning transport means.

Preferably, clearance between said placement and transport means and said auxiliary transport means is not more than 11 mm.

It is preferable that the light-sensitive material transport device further comprises a distributing means that distributes in plural rows in said main scanning direction said light-sensitive material received from said scanning transport means and placed and transported by said placement and transport means.

Preferably, a developing device receives said light-sensitive material sent out by said placement and transport means and said auxiliary transport means.

More preferably, when said plural rows of said light-sensitive material to be distributed by said distributing means is n (n being an integer of not less than 2), transport speed of said light-sensitive material by said placement and transport means is not less than n of the transport speed of said light-sensitive material in said developing device.

DETAILED DESCRIPTION OF THE INVENTION

On pages that follow, a light-sensitive material transport device of the invention will be described in more detail with reference to accompanying drawings.

Figure 1:
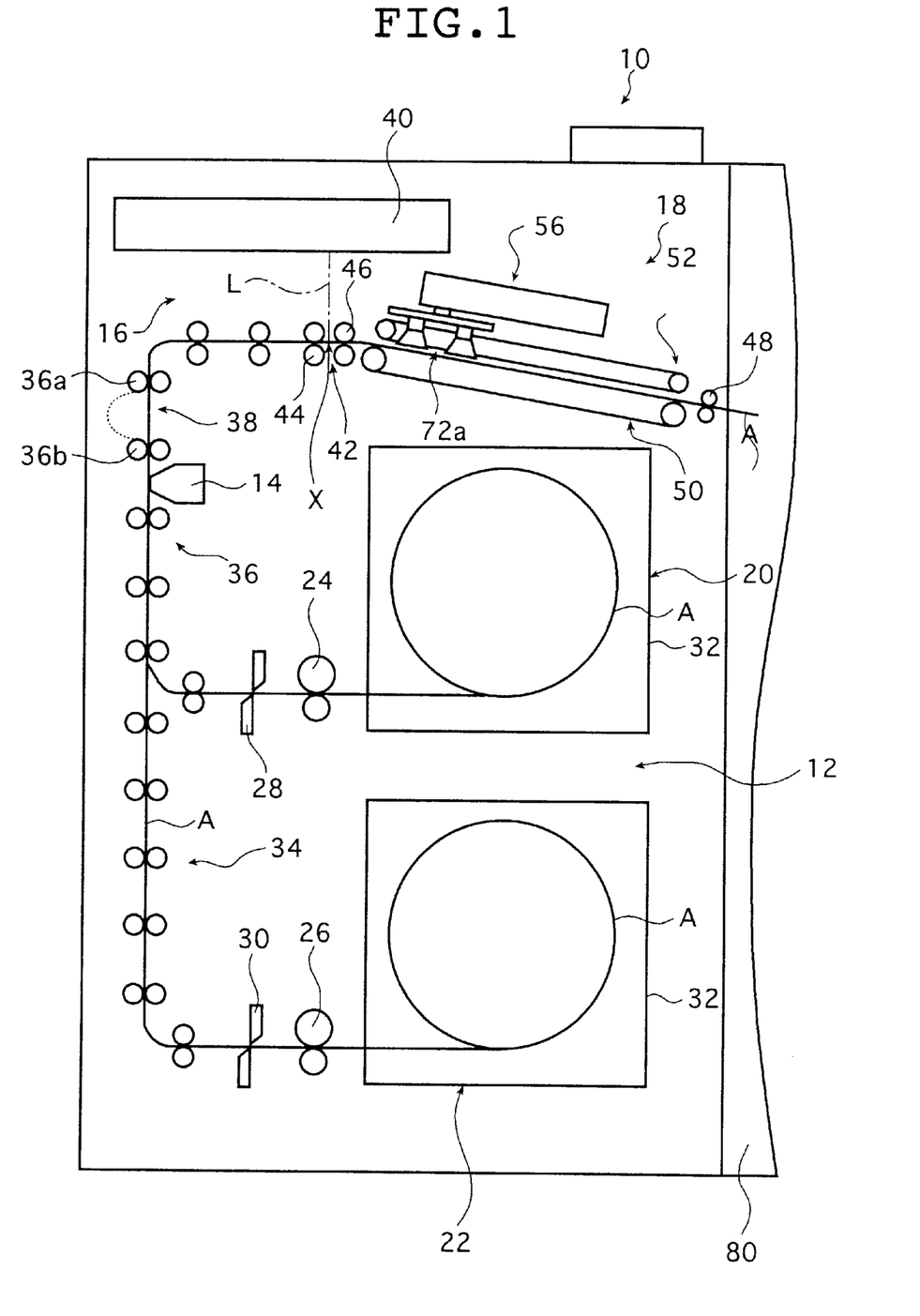
FIG. 1 is a conceptual diagram showing an embodiment of an image recording apparatus employing a light-sensitive material transport device according to the invention.

FIG. 1 is a schematic diagram showing an image recording apparatus utilizing the light-sensitive material transport device of the invention.

The image recording apparatus (hereinafter called recording apparatus) 10 shown in FIG. 1 for being used as an exposing apparatus in the aforementioned digital photoprinter cuts a web of light-sensitive material to individual sheets of a specified length associated with prints to be finally produced and, after back printing (recording of a back print) and digital scan exposure, distributes as required the exposed cut sheets of the light-sensitive material A into a plurality of rows which are then supplied to a processor (developing device) 80.

Having these capabilities, the recording apparatus 10 comprises a light-sensitive material supply section 12, a printer 14 for back print recording, an image recording section 16 for exposing the light-sensitive material A in a recording (exposing) position X and a distributing section 18 utilizing a light-sensitive material transport device (hereinafter called transport device) of the invention.

It should be noted that, in addition to the illustrated components, means of transporting the light-sensitive material A such as transport rollers, transport guides, sensors and various other members are also incorporated, as required, in the recording apparatus 10.

Further referring to the recording apparatus 10, the light-sensitive material supply section (hereinafter called as supply section) 12 is composed of loaders 20 and 22, withdrawing roller pairs 24 and 26, and cutters 28 and 30.

The loaders 20 and 22 are sites into which are loaded magazines 32 each containing a roll of light-sensitive material A within a lightproof case, with the recording surface side facing outward. The magazines 32 to be loaded into both the loaders 20 and 22 are usually adapted to contain various types of light-sensitive material A different in their size (width), surface gloss (silk-finish, matte and so forth), specifications (e.g. thickness and base type), and so forth from each other. The number of the magazines 32 that can be loaded is by no means limited to two and it may be only one or three and more depending on the size and structure of the recording apparatus 10.

The withdrawing roller pairs 24 and 26 are operated to withdraw the light-sensitive material A from the magazines 32 loaded into the corresponding loaders 20 and 22 for thereafter transporting the withdrawn light-sensitive material. This transport stops at the point of time when the light-sensitive material A has been transported downstream in the transport direction (hereinafter called as simply downstream) from the corresponding cutters 28 and 30 by a length corresponding to each of the prints to be finally produced. Subsequently, the cutters 28 and 30 are actuated to cut the light-sensitive material A to individual sheets of a specified length. It should be noted that one cutter may be used in a plurality of loaders.

The light-sensitive material A taken out of the magazine 32 in the loader 22 and cut into individual sheets of a specified length by means of the cutter 30 is transported upward by means of a first transport section 34 and a second transport section 36 consisting of a number of transport roller pairs. On the other hand, the light-sensitive material A taken out of the magazine 32 in the loader 20 and cut into individual sheets by means of the cutter 28 is transported upward by means of the second transport section 36. Subsequently, these sheets are both transported in the right direction to the image recording section 16 (scanning transport means 42) with the recording surface side facing upward.

The printer 14 is located in the middle of the second transport section 36.

The printer 14 is used to record on a non-record reverse surface of the light-sensitive material A (where no emulsion is applied), a back print consisting of various pieces of information such as the date when the picture was taken, the date of printing (exposure), frame number, film identification (ID) number (code), ID number of the camera used to take the picture and ID number of the photoprinter. The light-sensitive material A is subjected to back print recording by means of the printer 14 as it is transported by means of the second transport section 36.

Examples of the printer 14 for back print recording include back printers for use in known photoprinters such as an ink-jet printer, a dot impact printer and a thermal transfer printer. To be compatible with the recently developed Advanced Photo System, the printer 14 is preferably adapted to be capable of marking at least two lines at a time.

A loop forming area 38 is provided between the transport roller pairs 36a and 36b which are downstream of the printer 14 in the second transport section 36.

Thus, the transport speed of the light-sensitive material A in the second transport section 36 is set as follows: the speed in the transport roller pair 36a and subsequent components which are downstream of the loop forming area 38 is the same as the scanning transport speed in the image recording section 16 (scanning transport means 42), whereas the speed in the transport roller pair 36b and prior components which are upstream of the loop forming area 38 is higher than the above scanning transport speed. The light-sensitive material A transported through the second transport section 36 forms a loop in the loop forming area 38 in accordance with its size based on the difference in the upstream and downstream transport speeds, as shown by dotted line in FIG. 1.

In the illustrated recording apparatus 10, this configuration enables the separation of the printer 14 from the image recording section 16 with a short pathlength, whereby a highly precise scanning and transport of the light-sensitive material A in the course of exposure is realized.

The image recording section 16 comprises an exposing unit 40 and scanning transport means 42. Emitted from the exposing unit 40, the recording light L that is modulated in accordance with the image data (image to be recorded) and that forms a main scanning line perpendicular to the scanning transport direction is incident on the recording position X, as the light-sensitive material A is held in a specified recording position X by means of the scanning transport means 42 and transported for scanning, whereupon the light-sensitive material A is exposed by two-dimensional scanning to form a latent image on the material A.

It should be noted that, in the illustrated image recording section 16, a side registering (edge position regulation of the light-sensitive material A) is performed so that the center of the light-sensitive material A in its main scanning direction can be set to a specified position, and the light-sensitive material A is then exposed based on the center.

The exposing unit 40 is a known optical beam scanner using the light beams including laser beam as the recording light L. The exposing unit 40 is composed essentially of a light source which issues light beams for exposing the light-sensitive material A with red (R), green (G) and blue (B) lights, a modulating means such as AOM (acoustic optical modulator) which modulates the light beams issued from the light source in accordance with digital image data, a light deflector such as a polygonal mirror which deflects the modulated light beams in a main scanning direction, an fθ (scanning) lens and the like with which the light beams deflected in the main scanning direction (in the direction orthogonal to the direction in which the paper surfaces of FIGS. 1 and 2 spread) are focused to form an image at a specified point in the recording position X.

The exposing unit 40 may be replaced by various kinds of digital exposing means using various arrays of light-emitting devices and spatial modulating devices which extend in a direction perpendicular to the direction in which the light-sensitive material A is transported for scanning. Specific examples of such arrays include a PDP (plasma display) array, an ELD (electroluminescent display) array, an LED (light-emitting diode) array, an LCD (liquid-crystal display) array, a DMD (digital micromirror device) array, or a laser array.

On the other hand, the scanning transport means 42 comprises two transport roller pairs 44 and 46 that are provided on opposite sides of the recording position X (scanning line) and an exposure guide (not shown) to hold more precisely the light-sensitive material A in the recording position X. The light-sensitive material A is transported for scanning in the auxiliary scanning direction perpendicular to the main scanning direction, as it is held in the recording position X.

The light beams as the recording light L are deflected in the main scanning direction so that the light-sensitive material A is exposed by two-dimensional scanning with the recording light L modulated in accordance with the image data, thereby forming a latent image on the material A.

Another example includes scanning transport means using an exposing drum that transports the light-sensitive material A as it is held in the recording position X and two nip rollers which are provided on opposite sides of the recording position X in such a way that they are held in contact with the exposing drum.

A distributing section 18 is located in the downstream of the image recording section 16.

Figure 4:
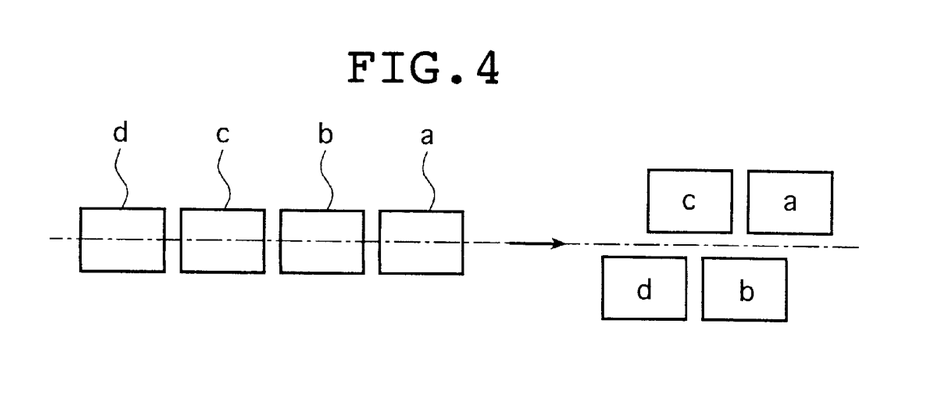
FIG. 4 is a conceptual diagram illustrating an example of distributing sheets of a light-sensitive material by the image recording apparatus shown in FIG. 1.

The distributing section 18 which utilizes the transport device of the invention receives the light-sensitive material A ejected from the scanning transport means 42 in the image recording section 16, optionally distributes individual sheets of the light-sensitive material A in the direction perpendicular to the direction of their transport (hereinafter called as lateral direction) to form a plurality of rows that overlap in the direction of transport as shown in FIG. 4 (hereinafter called as overlap) and then transports the light-sensitive material A to the transport roller pair 48 through which the light-sensitive material A is supplied to the processor 80.

By this, the throughput of the processor 80 can be enhanced, for example, almost doubled in two rows and tripled in three rows; hence, the time difference between exposure and development processing is practically cancelled.

Figure 2:
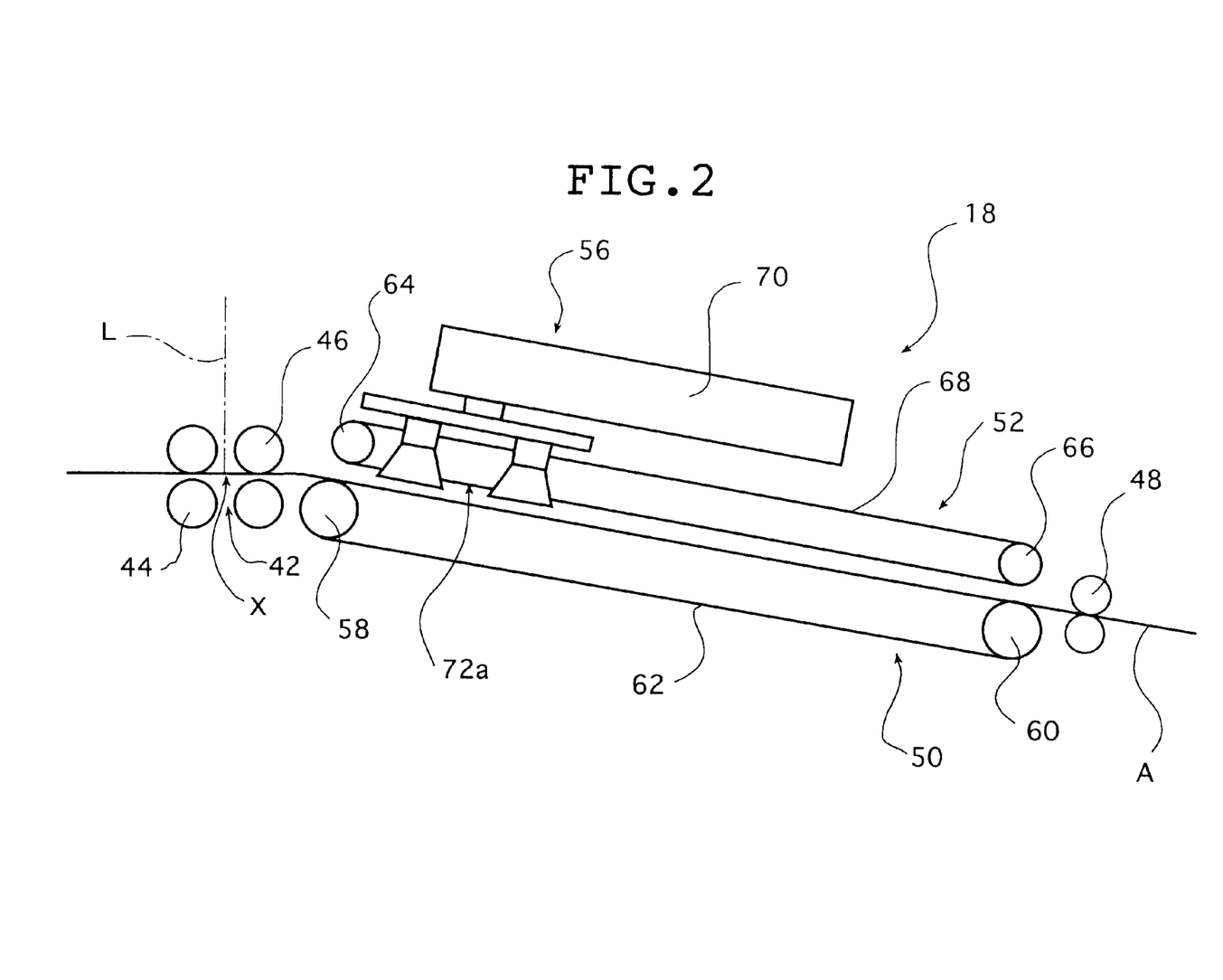
FIG. 2 is a schematic side view of an embodiment of the light-sensitive material transport device shown in FIG. 1.
Figure 3:
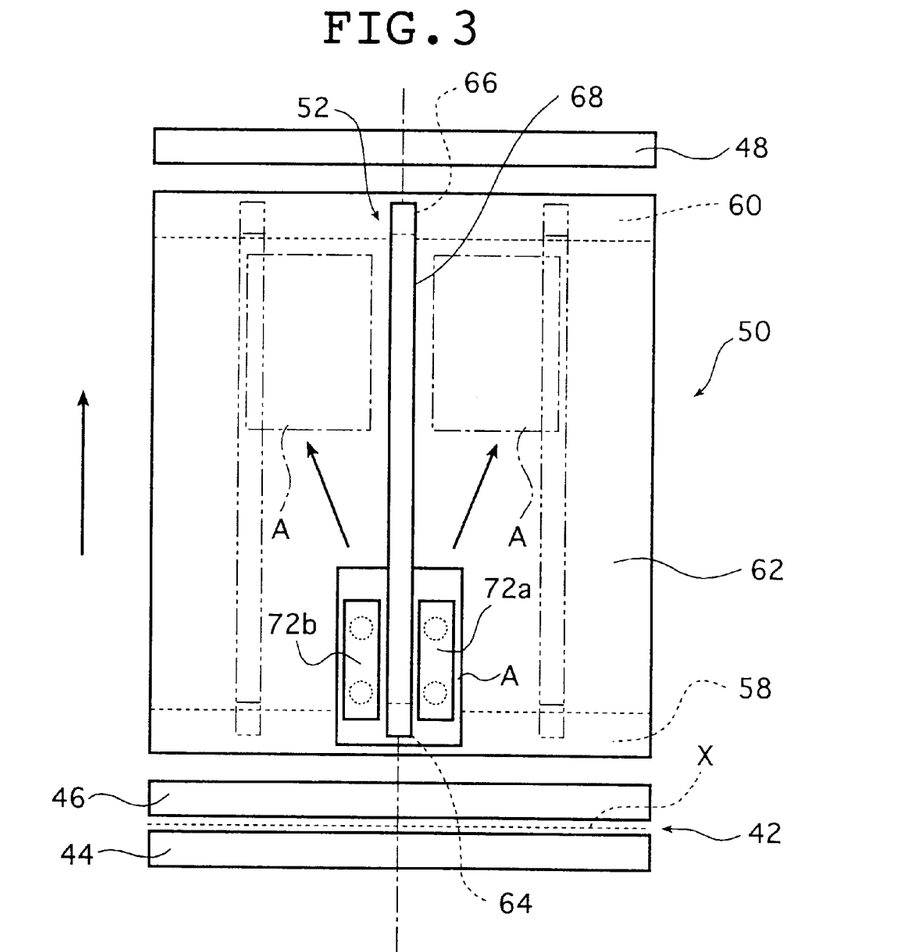
FIG. 3 is a schematic plan view of an embodiment of the light-sensitive material transport device shown in FIG. 2.

FIG. 2 is a schematic side view of the distributing section 18 and FIG. 3 is a schematic plan view (with part taken away) of the same section.

The distributing section 18 comprises basically the transport device of the invention having belt conveyor 50 and auxiliary belt conveyor 52, and a distributing device 56. The light-sensitive material A exposed in the image recording section 16 is ejected onto the belt conveyor 50, which carry the exposed light-sensitive material A to a specified position, whereupon it is lifted by the distributing device 56 and transported obliquely downstream to be set aside to either right or left; the light-sensitive material A is placed again on the belt conveyor 50 and transported as such to be fed to the transport roller pair 48.

The belt conveyor 50 and the auxiliary belt conveyor 52 are provided just downstream of the image recording section 16 (scanning transport means 42) which performs exposure on a center basis and which coincides with the distributing section 18 in terms of the center (center in this case is hereinafter called simply as "center") in a transverse direction (direction along the axis of rollers).

The belt conveyor 50 is of a known type that comprises two rollers 58 and 60, an endless belt 62 stretched between the two rollers 58 and 60 and a drive source which is not shown in FIG. 2.

The belt conveyor 50 which constitutes placement and transport means of the present invention transports the light-sensitive material A as it is placed on the belt conveyor 50. On the other hand, the scanning transport means 42 and the transport roller pair 48 which performs processor entry of the light-sensitive material A (or the transport means in the processor 80) typically pinches and transports the light-sensitive material A as it is held between the two members.

Therefore, even if a portion of the light-sensitive material A in the process of exposure is ejected from the scanning transport means 42 to be replaced on the belt conveyor 50, the transport speed of the light-sensitive material A is governed by the scanning transport means 42 and any difference that may occur between the transport speed of the belt conveyor 50 and the scanning transport speed will in no way affect the speed at which the light-sensitive material A being exposed is transported for scanning.

If the light-sensitive material A is released from the scanning transport means 42, it is transported by the belt conveyor 50 at their speed of travel to be fed into the transport roller pair 48. The transport speed of the transport roller pair 48 is equal to the transport speed in the processor 80 and typically slower than the transport speed of the belt conveyor 50 and the like in the recording apparatus 10. However, if the transport of the light-sensitive material A to the transport roller pair 48 is performed by the belt conveyor 50, its transport speed at the point of time when it is held between two rollers of the transport roller pair 48 is governed by that roller pair 48 and, hence, the exposed light-sensitive material A can be supplied into the processor 80 in a smooth and safe manner.

On the belt conveyor 50 of the transport device of the invention, when a plurality of rows of the light-sensitive material A to be distributed by the distributing device 56 is n (n being an integer of not less than 2), the transport speed of the light-sensitive material A by the belt conveyor 50 and the auxiliary belt conveyor 52 of the transport device of the invention is preferably n times or more the transport speed of the light-sensitive material A in the processor 80 (by the processor entry transport roller pair 48), that is, linear velocity of the transport roller pair 48 and processor 80, so as to allow the light-sensitive material A to be transported in a smooth manner from the transport device of the invention to the processor 80.

By taking the above, even if the linear velocity of the processor 80 (transport roller pair 48) is brought to the maximum speed and the scanning transport speed of the scanning transport means 42 is increased to n times its speed, the linear velocity of the belt conveyor 59 is more than n times the linear velocity of the transport roller pair 48 so that on the belt conveyor 50, the light-sensitive material A which is transported from the scanning transport means 42 at the speed of n times the linear velocity of the processor 80 can be distributed into n rows without sheets of the light-sensitive material A being stacked with each other whereupon sheets of the light-sensitive material A that are distributed into n rows are received by the transport roller pair 48, that is, the processor 80 in an efficient way and also in a smooth and safe way without stacking sheets with each other. This ensures to bring the processing capacity of the processor 80 to the maximum.

If the linear velocity of the belt conveyor 50 is n times or more the linear velocity of the transport roller pair 48, any speed is allowable without needing to establish the maximum limitation. However, even if the speed is unnecessarily too high, enhancement in efficiency of transport to the transport roller pair 48 is not expected so that the speed may be appropriately selected depending on the processing capacity (linear velocity of scanning transport means 42) of the image recording section 16 and the processing capacity of the processor 80.

In the recording apparatus 10, the distance between the scanning transport means 42 (particularly the transport roller pair 46) and the transport roller pair 48 depends on and must be greater than the length of a print that has the largest size in the direction of transport of all the prints to be handled by the recording apparatus 10; therefore, the position and transport length of the belt conveyor 50 are set at such values that depending on the distance between the scanning transport means 42 and the transport roller pair 48, the light-sensitive material A can be transported from the former to the latter in a consistent manner. If the distance between the scanning transport means 42 and the transport roller pair 48 is too long, the overall pathlength increases to eventually increase the equipment cost and size; this another consideration must be included in determining the distance between the scanning transport means 42 and the transport roller pair 48.

The width (lateral size) of the belt conveyor 50, that is, the lateral size of the endless belt 62, depends on various factors such as the maximum print size in the lateral direction and the number of rows into which sheets of the light-sensitive material are to be distributed that will be described later and a suitable value may be selected that ensures stable or consistent and sure or positive transport of the light-sensitive material A.

The auxiliary conveyor belts 52 located above the belt conveyor 50 constructed in such manner is of a known type that comprises two rollers 64 and 66, an endless belt 68 stretched between the two rollers 64 and 66 and a drive source which is not shown in FIG. 2. This auxiliary belt conveyor 52 which constitutes auxiliary transport means of the present invention is less wide than the belt conveyor 50 and is located along its center line and is driven at the same speed and in the same direction as the underlying belt conveyor 50.

The auxiliary belt conveyor 52 is spaced apart from the belt conveyor 50 at a certain distance so that they do not contact with each other.

The auxiliary belt conveyor 52 is not assigned for performing a job which nips and transports the light-sensitive material A cooperating with the main belt conveyor 50 as it is pinched between the endless belt 68 of the auxiliary belt conveyor 52 and another endless belt 62 of the belt conveyor 50; rather, making use of the curl (winding tendency) that the light-sensitive material A usually has, the auxiliary belt conveyor 52 is to depress downward the light-sensitive material A which is being transported as it is placed on the endless belt 62 of the belt conveyor 50 without hindering the exposure of the light-sensitive material A and in such manner as to lower the height of the curl. Therefore, the belt conveyor 50 functions as a main belt conveyor that transports the light-sensitive material A, while the auxiliary belt conveyor 52 has an auxiliary transport function for transporting to the main belt conveyor 50 the light-sensitive material A just after it is received from the scanning transport means 42, as well as a function for lowering the height of the curl of the light-sensitive material A.

The transport device of the invention, as a combination of the belt conveyor 50 and the auxiliary belt conveyor 52, not only receives the light-sensitive material A from the scanning transport means 42 without giving any detrimental effect to the scanning transport, but also depresses downward the light-sensitive material A with its auxiliary belt conveyor 52 without pinching it between the two belt conveyors to ensure positive transport ability expelling any detrimental effect to the scanning transport, whereby correction of the curl form of the light-sensitive material A is realized in such a way that a large curl is changed to be a smaller and uniform curl to enable the light-sensitive material A to be transported downstream in a stable and sure manner. In the illustration, the light-sensitive material A is flattened by the auxiliary belt conveyor 52, which helps the distribution device 56 suck and hold the light-sensitive material A, as will be described later, thereby enabling to distribute the light-sensitive material A in sheets in a stable and sure manner.

The belt conveyor 50 needs to have the light-sensitive material A placed on a placement surface (an outer surface) of the endless belt 62 and to surely transport the material A. The belt conveyor also needs to keep the light-sensitive material A in position when the light-sensitive material A placed on the placement surface of the endless belt 62 is depressed downward by the endless belt 68 of the auxiliary belt conveyor 52. Accordingly, friction coefficient of the placement surface of the endless belt 62 is required to some extent and preferably it is not too low. On the other hand, the auxiliary belt conveyor 52 depresses downward the light-sensitive material A usually having a curl placed on the endless belt 62 of the belt conveyor 50 by the endless belt 68 so that a curl portion of the light-sensitive material A, for example, a peripheral part of the curl needs to be slid in a smooth way by a contacting surface (outer surface) of the endless belt 68 while keeping the material A in place. Therefore, the friction coefficient of the contacting surface of the endless belt 68 is preferably not too high so as to ensure a smooth sliding of the curl.

From the above reason, the friction coefficient of the placement surface of the endless belt 62 of the belt conveyor 50 is preferably same or larger than that of the contacting surface of the endless belt 68 of the auxiliary belt conveyor 52.

More preferably, the friction coefficient of the placement surface of the endless belt 62 of the belt conveyor 50 is not less than 0.6 and that of the contacting surface of the endless belt 68 of the auxiliary belt conveyor 52 is not more than 0.6.

This reason will be described more in detail below.

If the friction coefficient of the placement surface of the endless belt 62 is less than 0.6, a sliding phenomenon is effected between the placement surface of the endless belt 62 and the light-sensitive material A. This causes the light-sensitive material A to move out of the position on the placement surface of the endless belt 62. Therefore, an accurate transport of the light-sensitive material A can not be performed so that a space between any two sheets of the light-sensitive material A fluctuates; hence, it sometimes becomes narrower, another time wider and the other time tilted. As a result, an inappropriate transport (paper jamming) is brought about.

On the other hand, if the friction coefficient of the contacting surface of the endless belt 68 is more than 0.6, a linear velocity of the transport roller pair 48 (transport speed of the light-sensitive material A) becomes lower than that of the endless belts 62 and 68. This causes a contacting area between an emulsion-coated surface of the light-sensitive material A and the contacting surface of the endless belt 68 becomes larger, namely, the friction between them becomes larger, thereby remarkably increasing the transport force. As a result, the light-sensitive material A is liable to be buckled.

The friction coefficient of the placement surface of the endless belt 62 is most preferably about 0.9 and its range is more preferably 0.9±0.1. On the other hand, the friction coefficient of the contacting surface of the endless belt 68 is most preferably about 0.5 and its range is more preferably 0.5±0.1.

The clearance between the auxiliary belt conveyor 52 and the belt conveyor 50, more in detail, between a lower surface (contacting surface) of the endless belt 68 of the auxiliary belt conveyor 52 and the upper surface (placement surface)

of the endless belt 62 of the belt conveyor 50, is not limited to any particular value and any appropriate value may be adopted in accordance with various conditions of the light-sensitive material A to be transported such as thickness, curl form and the like. However, in order to secure preferable transport ability, to perform a consistent transport and correction of a curly form by flattening the light-sensitive material A and to obtain favorable effects such as assistance in sucking and holding the light-sensitive material A by the distribution device 56, the clearance between the auxiliary belt conveyor 52 and the belt conveyor 50 is preferably set to be not more than 11 mm, more preferably not more than 5 mm and most preferably not more than 1 mm.

If the clearance between the auxiliary belt conveyor 52 and the belt conveyor 50 is unduly small, the light-sensitive material A is pinched by the two to affect its scanning transport adversely; hence, the clearance should be set as appropriate taking the thickness and the like of the light-sensitive material A into consideration.

In the illustration, the transport device of the invention is located in the distribution section 18 in which the auxiliary belt conveyor 52 is less wide than the belt conveyor 50 and is located along its center line, in order to distribute cut-sheets of the light-sensitive material A horizontally into either side of the center line in a plurality of rows with the distributing device 56. The present invention is not limited to this configuration in any particular way and the embodiments include that: the auxiliary belt conveyor 52 may be as wide as the belt conveyor 50; the auxiliary belt conveyor 52 may be separated into two horizontal rows (shown as chain double-dashed lines in FIG. 3) or may be made to be three rows adding a central row to the above two rows; and the auxiliary belt conveyor 52 may be a separated belt conveyor composed of a plurality of belt conveyors with more number than the above number, that is, the auxiliary belt conveyor 52 may comprise a separated belt composed of a plurality of conveyor belts prepared by laterally separating the endless belt 68 of the auxiliary belt conveyor 52. The auxiliary belt conveyor 52 may be appropriately arranged in such a way that the light-sensitive material A is preferably transported in accordance with applications of the transport device of the invention, kinds of the light-sensitive material to be transported and other conditions.

Transport speed of the light-sensitive material by means of the belt conveyor 50 and the auxiliary belt conveyor 52 may be determined as appropriate depending on various factors such as throughput of the recording apparatus 10, the scanning transport speed and the like. Preferably, the transport speed is slightly higher than the scanning transport speed, thereby ensuring that the advancing end of the cut sheet of the exposed light-sensitive material A is prevented from striking the belt conveyor 50 and also eliminating more positively any adverse effect that may impart to the scanning transport of the light-sensitive material A when it is placed on (brought into contact with) the belt conveyor 50.

If the transport speed of the belt conveyor 50 and the auxiliary belt conveyor 52 is much faster than the scanning transport speed, the scanning transport will be adversely affected and the light-sensitive material A is liable to be impaired by friction. Therefore, the above consideration is preferably included in determining the transport speed of the belt conveyor 50 and the auxiliary belt conveyor 52.

In the illustrated distributing section 18, the belt conveyor 50 is inclined to slope downward in the direction of transport of the light-sensitive material A.

This is a preferred embodiment in that the occurrence of troubles such as jamming of the light-sensitive material A due to the curl and its buckling is effectively prevented to ensure that the distributing device 18 can receive the light-sensitive material A from the scanning transport means 42 and supply it into the transport roller pair 48 in a more smooth and consistent manner. The angle by which the belt conveyor 50 inclines downward is not limited to any particular value, except that if it is too large, the light-sensitive material A will not stay on the belt conveyor 50 but just slide down; therefore, the inclination of the belt conveyor 50 is preferably between about 5 and 30 degrees.

In the illustration, the distributing device 56 is provided above the transport device of the invention to transport individual sheets of the light-sensitive material A for distributing them horizontally into a plurality of rows.

The distributing device 56 comprises a drive source 70 and two sucker units 72 (72a and 72b). The sheets of light-sensitive material A that were transported into a specified position on the belt conveyor 50 are lifted up slightly as they are sucked by the sucker unit 72a and distributed into a plurality of rows in such a way that some sheets are transported obliquely to the right downstream in the transport direction (hereinafter called as right) to place them on the belt conveyor 50 again and other sheets are transported obliquely to the left downstream in the transport direction in the same manner as has been done with the above sheets.

The drive source 70 actuates in such a way that the sucking unit 72 sucks and releases the light-sensitive material A and that the sucking unit 72 changes its positions and moves upward or downward.

In the illustration, the auxiliary belt conveyor 52 necessarily has an appropriate width in accordance with the minimum lateral size of the light-sensitive material A to be distributed in order that the two sucking units 72 (72a and 72b) are capable of securely or positively sucking and holding the light-sensitive material A Having these features, the distributing device 56 lifts up individual sheets of the light-sensitive material A and carries them laterally so that they can be distributed rapidly without depending on the transport speed of the belt conveyor 50 and the like. Moreover, since the prior sheet of the light-sensitive material A transported to the belt conveyor 50 has already been lifted up so as to be distributed, the next sheet of the light-sensitive material A is not interrupted from coming onto the belt conveyor 50, whereby the distributing device 56 can receive sheets of the light-sensitive material A on the belt conveyor 50 from the scanning transport means 42 and the like and distribute them in a continuous manner.

Briefly, the illustrated distributing section 18 is constructed such that the transport device of the invention is combined with the distributing device 56 that Lifts up and distributes individual sheets of the light-sensitive material A. As the result, the distributing section 18 is generally of short length in the transport path to realize a smaller size, a simpler construction at a lower cost. This section 18 can transport the light-sensitive material A from the recording section 16 to the processor 80 in a smooth and stable or consistent manner, thereby enabling to surely distribute individual sheets of the light-sensitive material A into a plurality of rows as they are transported from the recording section 16 to the processor 80. Moreover, individual sheets of the light-sensitive material A are each flattened by the auxiliary belt conveyor 68 so that the individual sheets of the light-sensitive material A can be sucked and held by the sucking unit 72 in a surely or positive manner.

When the distributing section 18 distributes the individual sheets of the light-sensitive material A, various kinds of distributing methods can be utilized.

An illustrated method, for example, can distribute individual sheets of the light-sensitive material A to right and left in such a way that the individual sheets of the light-sensitive material A transported into the specified position on the belt conveyor 50 are distributed in two rows as shown in FIG. 4 by using the sucker unit 72, namely 72a and 72b, which are alternatively moved.

The individual sheets of the light-sensitive material A are not limited to be distributed in two rows and can be distributed in three rows, for example, by repeating a distribution mode of left-right-center that is brought about by adding the above two rows with a row made of part of individual sheets of light-sensitive material A which travel straight without being distributed to either right or left.

In order to secure that the sucker unit 72 can positively suck and hold the light-sensitive material A, the belt conveyor 50 may stop the transport temporarily at the point of time when the light-sensitive material A is sucked by or released from the sucker unit 72.

Means and methods of moving the sucker unit 72 horizontally or vertically by the drive source 70 are not limited to any particular way and various known means and methods are available, the samples including means of using links, means of using cams, means of using guide rails and guide holes, means of using gears, means of using a rack-and-pinion, screw driving, belt driving or means of using cylinders, as well as suitable combinations of these means. Moreover, known means such as vacuum pumps may be used when the light-sensitive material A is sucked and held by the sucking unit 72.

In the illustration, two sucking units 72 (72a and 72b) are used. However, only one sucking unit 72 may be used, thereby distributing the sheets of the light-sensitive material A by lifting every other sheet to form a new row in the lateral direction, along with a row (original row) with sheets that pass straight.

Overlap may be performed either when individual sheets of the light-sensitive material A are distributed to form a plurality of rows on the belt conveyor 50 of the distribution section 18 or by making use of the difference between transport speeds of the belt conveyor 50 and the transport roller pair 48, when individual sheets of the light-sensitive material A are not overlapped on the belt conveyor 50.

The greater the overlap of the sheets of the light-sensitive material A are, the higher throughput of the processor 80 becomes.

However, if finished prints emerge from the processor 80 in such a way that the distance between two consecutive sheets (as measured between their trailing edges if they emerge from the processor 80 as they are held between nip rollers or other pinching means) is too small, it may be difficult to stack the prints in the order of exposure depending on factors such as the composition of the stacker or sorter. Hence, this possibility has to be considered in determining that the overlap of sheets of the light-sensitive material A is performed when they are distributed.

All individual sheets of light-sensitive material need not be distributed in the distributing section 18; if the width of the processor 80 and other design factors are such that sheets with a larger size than a certain size cannot be processed in a plurality of rows or in the case of performing on a batch basis rather than continuous processing, the successive sheets need not be distributed but may simply be fed into the processor 80 in a single row.

Moreover, sheets of the light-sensitive material A in all sizes are not necessarily distributed in same rows; hence, sheets may be distributed in different number of rows in accordance with the size of the sheets. For example, sheets with an L size may be distributed into 3 rows; sheets with a larger size than an L size may be distributed into two rows. In other cases such as processing a mixture of panoramic and L sizes, the distributing section 18 may be controlled in such a way that sheets of a panoramic size are not distributed but simply passed straight.

As already mentioned, the sheets of light-sensitive material A transported by the distributing section 18 are further transported by the transport roller pair 48 into the processor 80, where they are subjected to the necessary steps of processing including color development, bleach-fixing and rinsing, and thereafter dried to produce finished prints, which emerge from the processor.

While the light-sensitive material transport device has been described above in detail, it should be noted that the invention is by no means limited to the foregoing cases and various improvements and modifications may of course be made without departing from the scope and spirit of the invention.

As described above in detail, the light-sensitive material transport device of the invention located in the image recording apparatus that exposes cut sheets of the light-sensitive material for thereafter feeding the then exposed sheets of light-sensitive material to a developing device, wherein the device receives the exposed sheets of the light-sensitive material from the scanning transport means without imparting any effect to the scanning transport and can subsequently transport them in a stable and sure manner, as well as preferably performing correction of the curl of the cut sheets of the light-sensitive material.

What is claimed is:

1. A light-sensitive material transport device which is to be used in an image recording apparatus that forms in a recording position a scanning line of recording light extending in a main scanning direction by an exposing optical system, as well as transports a light-sensitive material with a first length for scanning in an auxiliary direction perpendicular to said main scanning direction by a scanning transport means in such a way that the light-sensitive material is held in said recording position, so as to expose the light-sensitive material for recording a latent image thereon by means of said recording light, and thereafter supplies the exposed light-sensitive material to a processor, said device comprising:

placement and transport means for placing and transporting the exposed light-sensitive material after it is received from said scanning transport means, wherein said placement and transport means includes a portion which is driven in a first direction; and auxiliary transport means spaced apart upward from said placement and transport means, said auxiliary transport means including a portion which is driven in said first direction.

2. The light-sensitive material transport device according to claim 1, wherein said placement and transport means is a belt conveyor.

3. The light-sensitive material transport device according to claim 1, wherein said auxiliary transport means is an auxiliary belt conveyor.

4. The light-sensitive material transport device according to claim 1, wherein said placement and transport means is a main belt conveyor, wherein said auxiliary transport means is the auxiliary belt conveyor, and wherein a friction coefficient of a belt surface of said main belt conveyor is the same as or larger than that of the belt surface of said auxiliary belt conveyor.

5. The light-sensitive material transport device according to claim 4, wherein the friction coefficient of the belt surface of said auxiliary belt conveyor is not more than 0.6, while the friction coefficient of the belt surface of said main belt conveyor is not less than 0.6.

6. The light-sensitive material transport device according to claim 3, wherein said auxiliary belt conveyor comprises a separated belt composed of a plurality of conveyor belts.

7. The light-sensitive material transport device according to claim 1, wherein said placement and transport means as well as the auxiliary transport means transport the light-sensitive material at a speed which is greater than that by which said scanning transport means transports the light-sensitive material.

8. The light-sensitive material transport device according to claim 1, wherein clearance between said placement and transport means and said auxiliary transport means is not more than 11 mm.

9. The light-sensitive material transport device according to claim 1, further comprising a distributing means that distributes in plural rows in said main scanning direction said light-sensitive material received from said scanning transport means and placed and transported by said placement and transport means.

10. The light-sensitive material transport device according to claims 9, wherein a developing apparatus receives said light-sensitive material sent out by said placement and transport means and said auxiliary transport means.

11. The light-sensitive material transport device according to claim 10, wherein, when said plural rows of said light-sensitive material to be distributed by said distributing means is n (n being an integer of not less than 2), transport speed of said light-sensitive material by said placement and transport means is not less than n of the transport speed of said light-sensitive material in said developing apparatus.

12. The light-sensitive material transport device according to claim 1, wherein said placement and transport means does not contact said auxiliary transport means.

13. The light-sensitive material transport device according to claim 1, wherein said placement and transport means does not form a nip with said auxiliary transport means.

14. The light-sensitive material transport device according to claim 1, in combination with an image recording apparatus and a developing processor, wherein said light-sensitive material transport device is disposed between said image recording apparatus and said developing processor so as to transport light-sensitive material from said image recording apparatus to said developing processor.

15. A light-sensitive material transport device which is to be used in an image recording apparatus that forms in a recording position a scanning line of recording light extending in a main scanning direction by an exposing optical system, as well as transports a light-sensitive material for scanning in an auxiliary direction perpendicular to said main scanning direction in such a way that the light-sensitive material is held in said recording position so as to expose the light-sensitive material for recording a latent image thereon, and thereafter supplies the exposed light-sensitive material to a processor, said device comprising:

a belt conveyor disposed so as to receive the exposed light-sensitive material from said image recording apparatus, wherein said belt conveyor includes a portion which is driven in a first direction; and an auxiliary belt conveyor spaced apart upward from said belt conveyor, said auxiliary belt conveyor including a portion which is driven in said first direction.

16. The light-sensitive material transport device according to claim 15, wherein said belt conveyor does not contact said auxiliary belt conveyor.

17. The light-sensitive material transport device according to claim 15, wherein said belt conveyor does not form a nip with said auxiliary belt conveyor.

18. The light-sensitive material transport device according to claim 15, in combination with an image recording apparatus and a developing processor, wherein said light-sensitive material transport device is disposed between said image recording apparatus and said developing processor so as to transport light-sensitive material from said image recording apparatus to said developing processor.

* * * * *